(12) United States Patent
Gomaa et al.

(10) Patent No.: US 10,113,406 B1
(45) Date of Patent: Oct. 30, 2018

(54) PULSED HYDRAULIC FRACTURING WITH NANOSILICA CARRIER FLUID

(71) Applicant: Saudi Arabian Oil Company, Dhahran (SA)

(72) Inventors: Ahmed M. Gomaa, Khobar (SA); Khalid R. Noaimi, Khobar (SA); Ghaithan A. Al-Muntasheri, Khobar (SA); Noor Othman Bagader, Khobar (SA); Rajendra Arunkumar Kalgaonkar, Abqaiq (SA); Jin Huang, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/711,955

(22) Filed: Sep. 21, 2017

(51) Int. Cl.
| | |
|---|---|
| *E21B 43/267* | (2006.01) |
| *C09K 8/46* | (2006.01) |
| *C09K 8/80* | (2006.01) |
| *C09K 8/68* | (2006.01) |
| *C09K 8/66* | (2006.01) |

(52) U.S. Cl.
CPC .............. *E21B 43/267* (2013.01); *C09K 8/46* (2013.01); *C09K 8/665* (2013.01); *C09K 8/68* (2013.01); *C09K 8/80* (2013.01)

(58) Field of Classification Search
CPC ......... E21B 43/26; E21B 43/267; C09K 8/46; C09K 8/665; C09K 8/68; C09K 8/80
See application file for complete search history.

(56) References Cited

U.S. PATENT DOCUMENTS

| | | | | |
|---|---|---|---|---|
| 7,581,590 | B2 * | 9/2009 | Lesko | C09K 8/665 166/280.1 |
| 8,584,755 | B2 * | 11/2013 | Willberg | C09K 8/706 166/280.1 |
| 9,080,440 | B2 * | 7/2015 | Panga | C09K 8/70 |
| 9,181,789 | B2 * | 11/2015 | Nevison | E21B 43/26 |

(Continued)

OTHER PUBLICATIONS

Van Poolien, H. K. , "Productivity vs. Permeability Damage in Hydraulically Produced Fracture", Halliburton Oil Well Cementing Co., Duncan OK, presented at meeting of Southwestern District Division of Production, Dallas, TX, Mar. 1957; 8 pages.

(Continued)

*Primary Examiner* — Zakiya W Bates
*Assistant Examiner* — Crystal J Miller
(74) *Attorney, Agent, or Firm* — Fish & Richardson P.C.

(57) ABSTRACT

Fracturing a reservoir includes providing a pad fluid to the reservoir via a wellbore in a well to create fractures in the reservoir, providing a fracturing fluid to the fractures via the wellbore, providing a nanosilica carrier fluid to the fractures via the wellbore, activating the nanosilica particles with an activator to yield a nanosilica gel, and shutting in the wellbore at a wellbore pressure, thereby allowing the nanosilica gel to form proppant pillars in the fractures. The nanosilica carrier fluid includes nanosilica particles, and providing the nanosilica carrier fluid to the fractures comprises pulsing quantities of the nanosilica carrier fluid into a continuous flow of the fracturing fluid or alternately pulsing quantities of the nanosilica carrier fluid and the fracturing fluid. An elapsed time between pulsing the quantities of the nanosilica carrier fluid is between 2 seconds and 10 minutes.

25 Claims, 4 Drawing Sheets

(56) References Cited

U.S. PATENT DOCUMENTS

| | | | |
|---|---|---|---|
| 9,447,673 B2 | 9/2016 | Medvedev et al. | |
| 9,863,231 B2 | 1/2018 | Hull | |
| 2008/0135242 A1* | 6/2008 | Lesko | C09K 8/665 |
| | | | 166/268 |
| 2008/0149329 A1 | 6/2008 | Cooper | |
| 2012/0125618 A1* | 5/2012 | Willberg | C09K 8/706 |
| | | | 166/308.1 |
| 2012/0247764 A1* | 10/2012 | Panga | C09K 8/70 |
| | | | 166/280.2 |
| 2012/0305247 A1 | 12/2012 | Chen | |
| 2014/0000899 A1* | 1/2014 | Nevison | E21B 43/26 |
| | | | 166/308.1 |
| 2014/0131040 A9* | 5/2014 | Panga | C09K 8/70 |
| | | | 166/280.2 |
| 2014/0144633 A1* | 5/2014 | Nguyen | C04B 38/10 |
| | | | 166/281 |
| 2014/0144635 A1* | 5/2014 | Nguyen | E21B 43/267 |
| | | | 166/281 |
| 2014/0290943 A1 | 10/2014 | Ladva | |
| 2014/0352954 A1 | 12/2014 | Lakhtychkin et al. | |
| 2015/0211346 A1* | 7/2015 | Potapenko | E21B 43/26 |
| | | | 166/280.2 |
| 2015/0369028 A1* | 12/2015 | Potapenko | E21B 43/267 |
| | | | 166/280.2 |
| 2016/0153274 A1 | 6/2016 | Hull et al. | |
| 2016/0319189 A1* | 11/2016 | Dusterhoft | E21B 43/04 |

OTHER PUBLICATIONS

Barree, R.D. et al., "Realistic Assessment of Proppant Pack Conductivity for Material Selection", Presented at the Annual Technical Conference, Denver, Colorado, USA, Oct. 5-8; Society of Petroleum Engineers, 2003, Paper SPE-84306; http://dx.doi.org/10.2118/84306-MS; 12 pages.

Palisch, Terry et al., "Determining Realistic Fracture Conductivity and Understanding its Impact on Well Performance—Theory and Field Examples", Presented at the 2007 Hydraulic Fracturing Technology Conference, College Station, TX, USA, Jan. 29-31, 2007; Society of Petroleum Engineers, 2007, Paper SPE-106301; http://dx.doi.org/10.2118/106301-MS; 13 pages.

Gomaa, Ahmed M. et al., "Improving Fracture Conductivity by Developing and Optimizing Channels within the Fracture Geometry: CFD Study", presented at SPE International Conference on Formation Damage Control in Lafayette, LA, USA, Feb. 24-26; Society of Petroleum Engineers, 2016, Paper SPE-178982-MS; http://dx.doi.org/10.2118/178982-MS; 25 pages.

Gillard, M. et al., "A New Approach to Generating Fracture Conductivity", Presented at the SPE Annual Technical Conference and Exhibition held in Florence, Italy, Sep. 20-22; Society of Petroleum Engineers, 2010, Paper SPE-135034; http://dx.doi.org/10.2118/135034-MS; 13 pages.

Vincent, M.C.., "Five Things You Didn't Want to Know About Hydraulic Fractures", Chapter 4, Presented at Proceedings of the International Conference for Effective and Sustainable Hydraulic Fracturing, Brisbane Austrialia, May 2013; http://dx.doi.org/10.5772/56066; 14 pages.

Poollen, H.K. et al., "Hydraulic Fracturing—Fracture Flow Capacity vs. Well Productivity", Halliburton Oil Well Cementing Co., Duncan, OK; Presented at 32nd Annual Fall Meeting of Society of Petroleum Engineers in Dallas, TX, Oct. 6-9, 1957, vol. 213, 1958, Paper SPE-890-G; 5 pages.

Kern, L.R. et al., "Propping Fractures with Aluminum Particles", Journal of Petroleum Technology, Jun. 1961, pp. 583-589, Paper SPE-1573-G; http://dx.doi.org/10.2118/1573-G-PA; 7 pages.

Tinsley, J.M. et al., "A New Method for Providing Increased Fracture conductivity and Improving Stimulation Results", Journal of Petroleum Technology, Nov. 1975, pp. 1319-1325; http://dx.doi.org/10.2118/4676-PA; 7 pages.

Mayerhofer, M. J. et al., "Proppants? We Don't Need No Proppants", Presented at the SPE Annual Technical Conference and Exhibition, Oct. 5-7, 1997, San Antonio TX; Society of Petroleum Engineers, Inc. 1997, pp. 457-464, Paper SPE-38611; http;//dx.doi.org/10.2118/38611-MS; 8 pages.

Vincent, M.C., "Examining Our Assumptions—Have Oversimplifications Jeopardized Our Ability to Design Optimal Fracture Treatments?", Presented at the SPE Hydraulic Fracturing Technology Conference, The Woodlands, USA, Jan. 19-21, 2009, Society of Petroleum Engineers 2009, Paper SPE-119143; http://dx.doi.org/10.2118/119143-MS; 51 pages.

Meyer, Bruce R. et al., "Theoretical Foundation and Design Formulae for Channel and Pillar Type Propped Fractures—A Method to Increase Fracture Conductivity", Presented at SPE Annual Technical Conference and Exhibition, Amsterdam, The Netherlands, Oct. 27-29, 2014; Society of Petroleum Engineers 2014, Paper SPE-170781-MS; http:// dx.doi.org/10.2118/170781-MS; 25 pages.

Gomaa, Ahmed M., et al., "Computational Fluid Dynamics Applied to Investigate Development and Optimization of Highly Conductive Channels within the Fracture Geometry", Presented at the SPE Hydraulic Fracturing Technology Conference, The Woodlands, Texas, USA, Feb. 9-11, 2016; Society of Petroleum Engineers 2016, Paper SPE-179143-MS; http://dx.doi.org/10.2118/179143-MS; 18 pages.

\* cited by examiner

PULSED HYDRAULIC FRACTURING WITH NANOSILICA CARRIER FLUID

TECHNICAL FIELD

This invention relates to pulsed hydraulic fracturing of a reservoir with nanosilica carrier fluid to yield isolated proppant pillars in the reservoir.

BACKGROUND

The success of a fracturing stimulation treatment depends at least in part on the strength and distribution of the proppant used to prevent the created fracture from closing after treatment. Even for simple and wide features with high proppant placement efficiency throughout the entire fracture geometry, current mathematical and engineering concepts still overestimate the flow capacity of fractures by orders of magnitude. Permeability of the proppant pack may be reduced by a combination of factors such as residual damage from poor gel recovery, fines migration, multiphase flow, fluid momentum losses, drag forces, capillary forces, and proppant crushing and embedment. In some cases, conventional proppant packs lose up to 99% of initial conductivity due to gel damage, fines migration, multiphase flow, and non-Darcy flow.

SUMMARY

In a first general aspect, fracturing a reservoir includes providing a pad fluid to the reservoir via a wellbore in a well to create fractures in the reservoir, providing a fracturing fluid to the fractures via the wellbore, providing a nanosilica carrier fluid to the fractures via the wellbore, activating the nanosilica particles with an activator to yield a nanosilica gel, and shutting in the wellbore at a wellbore pressure, thereby allowing the nanosilica gel to form proppant pillars in the fractures. The nanosilica carrier fluid includes nanosilica particles, and providing the nanosilica carrier fluid to the fractures includes pulsing quantities of the nanosilica carrier fluid into a continuous flow of the fracturing fluid or alternately pulsing quantities of the nanosilica carrier fluid and the fracturing fluid. An elapsed time between pulsing the quantities of the nanosilica carrier fluid is between 2 seconds and 10 minutes.

Implementations of the first general aspect may include one or more of the following features.

The pad fluid typically includes at least one of a reactive fluid, slickwater, a linear gel, a crosslinked gel, a viscoelastic surfactant fluid, and a foam gel. The fracturing fluid typically includes at least one of a reactive fluid, slickwater, a linear gel, a crosslinked gel, a viscoelastic surfactant fluid, and a foam gel. In some cases, the fracturing fluid includes a proppant loading of up to about 12 pounds per gallon added. In some cases, the fracturing fluid is substantially free of proppant.

In some embodiments, the nanosilica carrier fluid includes a proppant loading of up to about 12 pounds per gallon added. The nanosilica carrier fluid may include colloidal nanosilica particles. In some cases, a viscosity of the nanosilica gel is at least 1000 cP at a reservoir temperature in a range of 150° F. to 400° F. The nanosilica carrier fluid may include at least one of an activator, a permeability enhancing agent, an accelerating agent, and a retarding agent. The permeability enhancing agent may include polylactic acid. The polylactic acid may be in the form of beads, fibers, or fabric. The permeability enhancing agent may include at least one of a resin, a salt, benzoic acid, and wax beads. The salt may be an acid salt.

In some embodiments, the elapsed time between pulsing the quantities of the nanosilica carrier fluid is between 10 seconds and 1 minute. Pulsing the quantities of the nanosilica carrier fluid may include pulsing discrete quantities of the nanosilica carrier fluid into the continuous flow of the fracturing fluid or alternately pulsing discrete quantities of the nanosilica carrier fluid and discrete quantities of the fracturing fluid. The discrete quantities of the nanosilica carrier fluid are typically spaced apart from each other. Pulsing the quantities of the nanosilica carrier fluid may include injecting the nanosilica carrier fluid at a rate between 1 barrel per minute and 120 barrels per minute. In some cases, pulsing the quantities of the nanosilica carrier fluid includes injecting the nanosilica carrier fluid at a rate between 5 barrels per minute and 50 barrels per minute.

Implementations of the first general aspect may include, after providing the fracturing fluid and the nanosilica carrier fluid to the fractures, providing a continuous flow of an additional fluid to the fractures. The additional fluid may be a second nanosilica carrier fluid having a proppant loading of up to 12 pounds per gallon added. In some cases, the fracturing fluid is a first fracturing fluid, the additional fluid is a second fracturing fluid, and the second fracturing fluid includes a proppant loading of up to 12 pounds per gallon added.

A compressive strength of the proppant pillars typically exceeds an overburden pressure of the reservoir. The compressive strength of the proppant pillars may be in a range of 500 pounds per square inch to 20,000 pounds per square inch. A permeability of the proppant pillars may be in a range of 0.00001 Darcy to 20,000 Darcy. In some cases, a permeability of the proppant pillars is substantially zero.

DETAILED DESCRIPTION

To avoid loss of conductivity of a proppant pack in a reservoir, isolated proppant pillars are formed to support the fracture and keep it open. The isolated proppant pillars form conductive channels that provide a path having high conductivity for hydrocarbon flow. As described herein, stable proppant pillars are generated by providing pulses of a nanosilica carrier fluid within a compatible fracturing fluid or by alternating pulses of a nanosilica carrier fluid with pulses of a compatible fracturing fluid through the wellbore into the reservoir at fracture pressure. The nanosilica carrier fluid typically includes nanosilica particles and a proppant. The fracturing fluid is typically a clean fracturing fluid that is free of proppant. The nanosilica carrier fluid carries the proppant during the treatment time as well as during closure time with little or no settling of the proppant. The pulsing injection pattern allows the nanosilica carrier fluid to deliver proppant to the fractures in an isolated pattern shape, creating proppant pillars in the fractures. Breaking of the fracturing fluid creates open channels that provide a path for hydrocarbon flow in the fractures.

Figure 1:
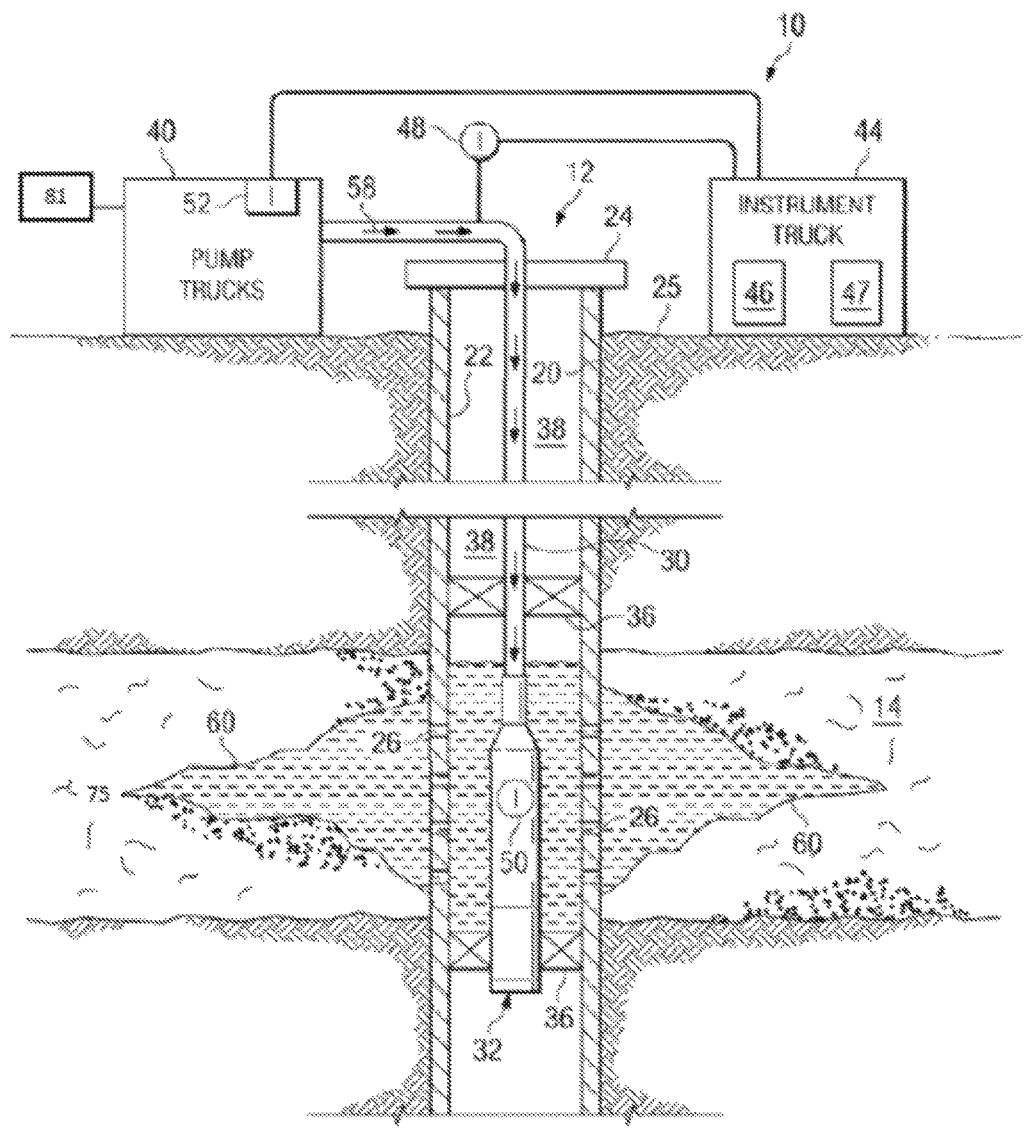
FIG. 1 depicts an exemplary hydraulic fracture treatment for a well.

FIG. 1 depicts an example of a fracture treatment 10 for a well 12. The well 12 can be a reservoir or formation 14, for example, an unconventional reservoir in which recovery operations in addition to conventional recovery operations are practiced to recover trapped hydrocarbons. Examples of unconventional reservoirs include tight-gas sands, gas and oil shales, coalbed methane, heavy oil and tar sands, and gas-hydrate deposits. In some implementations, the formation 14 includes an underground formation of naturally fractured rock containing hydrocarbons (for example, oil, gas, or both). For example, the formation 14 can include a fractured shale. In some implementations, the well 12 can intersect other suitable types of formations 14, including reservoirs that are not naturally fractured in any significant amount.

The well 12 can include a wellbore 20, casing 22 and well head 24. The wellbore 20 can be a vertical or deviated bore. The casing 22 can be cemented or otherwise suitably secured in the wellbore 12. Perforations 26 can be formed in the casing 22 at the level of the formation 14 to allow oil, gas, and by-products to flow into the well 12 and be produced to the surface 25. Perforations 26 can be formed using shape charges, a perforating gun or otherwise.

For the fracture treatment 10, a work string 30 can be disposed in the wellbore 20. The work string 30 can be coiled tubing, sectioned pipe or other suitable tubing. A fracturing tool 32 can be coupled to an end of the work string 30. Packers 36 can seal an annulus 38 of the wellbore 20 above and below the formation 14. Packers 36 can be mechanical, fluid inflatable or other suitable packers.

One or more pump trucks 40 can be coupled to the work string 30 at the surface 25. The pump trucks 40 pump fluid 58 down the work string 30 to perform the fracture treatment 10 and generate the fracture 60. The fluid 58 can include a pad fluid, fracturing fluid, a nanosilica carrier fluid, other appropriate fluids, or any combination thereof. The pump trucks 40 can include mobile vehicles, equipment such as skids or other suitable structures.

One or more instrument trucks 44 can also be provided at the surface 25. The instrument truck 44 can include a fracture control system 46 and a fracture simulator 47. The fracture control system 46 monitors and controls the fracture treatment 10. The fracture control system 46 can control the pump trucks 40 and fluid valves to stop and start the fracture treatment 10 as well as to stop and start the pad phase, proppant phase and/or flush phase of the fracture treatment 10. The fracture control system 46 communicates with surface and/or subsurface instruments to monitor and control the fracture treatment 10. In some implementations, the surface and subsurface instruments may include surface sensors 48, down-hole sensors 50 and pump controls 52.

A quantity of energy applied by the fracture control system 46 to generate the fractures 60 in the reservoir or formation 14 can be affected not only by the properties of the reservoir rock in the formation but also by the organic matter (for example, kerogen 75) intertwined within the rock matrix.

Figure 2:
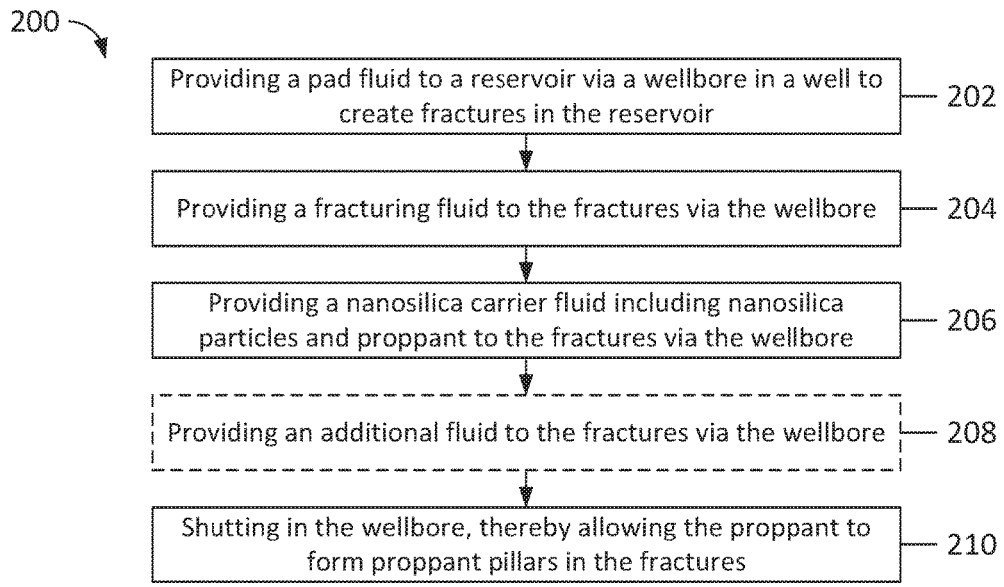
FIG. 2 is a flowchart for a method of pulsed hydraulic fracturing with nanosilica as a carrier fluid.

FIG. 2 is a flowchart showing operations in process 200 for fracturing a reservoir with a nanosilica carrier fluid. The nanosilica carrier fluid can be activated to form a nanosilica gel. The nanosilica carrier fluid typically has a viscosity of less than about 5 cP at 75° F. Nanosilica gel is an inorganic gel based system. A viscosity of nanosilica gel is typically at least 1000 cP or higher at temperature range of 75° F. to 350° F. Nanosilica particles are prepared in a multistep process in which an alkali-silicate solution is partially neutralized, leading to the formation of silica nuclei. The subunits of colloidal silica particles are typically between about 1 nm and about 5 nm. If the pH of the solution is reduced below 7 or if an activator is added, then the units tend to fuse together in chains. These products are often called silica gels. If the pH is kept slightly on the alkaline side of neutral, then the subunits stay separated, and they gradually grow. These products are often called precipitated silica or silica sols. Hydrogen ions from the surface of colloidal silica tend to dissociate in aqueous solution, yielding a high negative charge. Because of the very small particle size, the surface area of colloidal silica is very high.

In 202, a pad fluid is provided to the reservoir via a wellbore to create fractures in the reservoir. Suitable pad fluids include reactive fluids, slickwater, linear gels, crosslinked gels, viscoelastic surfactant fluids, and foam gels. "Reactive fluid" generally refer to acid solutions, such as hydrochloric acid (e.g., 15% or 28%), formic acid, and acetic acid. "Slickwater" generally refers to a low-viscosity fluid pumped at a high rate to generate narrow, complex fractures with low-concentrations of propping agent. "Linear gel" generally refers to an uncrosslinked solution of polysaccharides such as guar, derivatized-guar, HEC, or xanthan and having a viscosity of up to about 100 cP at surface temperature. "Crosslinked gel" generally refers to polysaccharides such as guar, derivatized-guar, HEC, or xanthan crosslinked with a crosslinker such as boron, zirconium, titanium, or aluminum, and having a viscosity of about 100 cP to about 1000 cP at surface temperature. "Viscoelastic surfactant fluid" generally refers to a polymer-free fluid that generates a viscosity suitable for fracturing operations without the use of polymer additives. "Foam gel" generally refers to fluids with one or more compressible gas components, such as $CO_2$, $N_2$ or any combination of gases that is dispersed in a small volume of liquid.

In 204, a fracturing fluid is provided to the fractures via the wellbore. Suitable fracturing fluids include reactive fluids, slickwater, linear gels, crosslinked gels, viscoelastic surfactant fluids, and foam gels. In some embodiments, the fracturing fluid is a clean fluid and is free of substantially free of proppant. In some embodiments, the fracturing fluid includes a proppant loading of up to about 12 pounds per gallon added.

The proppant may be a resin-coated proppant, an encapsulated resin, or a combination thereof. A proppant is a material that keeps an induced hydraulic fracture at least partially open during or after a fracturing treatment. Proppants can be transported into the reservoir and to the fractures using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants include sand, gravel, glass beads, polymer beads, ground products from shells and seeds such as walnut hulls, and manmade materials such as ceramic proppant, bauxite, tetrafluoroethylene materials (for example, TEFLON™ available from DuPont), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, proppant can have an average particle size, in which particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The composition or mixture can include any suitable amount of proppant, such as about 0.000.1 wt % to about 99.9 wt %, about 0.1 wt % to about 80 wt %, or about 10 wt % to about 60 wt %, or about 0.000,000.01 wt % or less, or about 0.000001 wt %, 0.0001, 0.001, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9 wt %, or about 99.99 wt % or more.

In 206, a nanosilica carrier fluid is provided to the fractures via the wellbore. The nanosilica carrier fluid includes an activator and nanosilica particles. In some embodiments, the nanosilica carrier fluid includes one or more of a proppant, a permeability enhancing agent, and a retarding agent.

An average particle size of the nanosilica particles is typically between about 1 nm and about 100 nm, where "particle size" refers to the largest dimension of the particle. The nanosilica particles may be in the form of colloidal nanosilica. A loading of the proppant may be up to about 12 pounds per gallon added.

The nanosilica carrier fluid includes an activator. Suitable activators include sodium chloride, potassium chloride, calcium chloride, and sodium carbonate. The activator is typically present in a concentration of about 0.1 wt % to about 50 wt %. For comparable concentrations, sodium chloride typically yields a stronger gel in a shorter time than other activators. In one example, the activator is an aqueous solution including about 10 wt % of sodium chloride. Activation of the nanosilica typically occurs over time after pumping. In some examples, activation of the nanosilica occurs in up to about 2 hours after pumping.

In some embodiments, the nanosilica carrier fluid includes a proppant. Proppant may be added in an amount up to about 12 pounds of proppant per gallon of the nanosilica carrier fluid.

In some embodiments, the nanosilica carrier fluid includes a permeability enhancing agent. Permeability enhancing agents include components that create conductive void spaces within proppant pillars formed by the nanosilica carrier fluid. Permeability enhancing agents include components that decompose under ambient conditions in the reservoir, water-soluble components that dissolve in water present in the reservoir, reactants that release gas or foam in the nanosilica carrier fluid, and vegetable oil. Examples of permeability enhancing agents include polylactic acid (e.g., in the form of beads, fiber, or fabric), resins, salts, benzoic acid, and wax beads. Suitable wax beads include wax beads in a range of mesh sizes of about 2 to about 200. Suitable salts include acid salts. Examples of acid salts include polylactic acid salt and esters that generate salts.

In some embodiments, the nanosilica carrier fluid includes an accelerating agent to accelerate gelling and hardening of the nanosilica gel in the reservoir. Examples of suitable accelerating agents include pH buffer fluids such as hydroxides, carbonates, bicarbonates, amines, or any combination thereof, at a concentration sufficient to reduce the gelling time from hours to minutes. In some examples, the pH buffer fluid is present at a loading up to about 10 vol % of the nanosilica carrier fluid.

In some embodiments, the nanosilica carrier fluid includes a retarding agent to retard the gelling and hardening of the nanosilica gel in the reservoir. Examples of suitable retarding agents include chelating agents, such as glutamic acid diacetic acid (GLDA), methylglycindiacetic acid (MGDA), ethylenediaminetetraacetic acid (EDTA), N-(hydroxyethyl)-ethylenediaminetriacetic (HEDTA) up to 10 vol %. The retarding agent typically increases the gelling time from hours to days.

In some embodiments, providing the nanosilica carrier fluid to the fractures includes pulsing quantities of the nanosilica carrier fluid into a continuous flow of the fracturing fluid. The quantities of the nanosilica carrier fluid may be discrete quantities that are spaced apart from each other. Pulsing quantities of the nanosilica carrier fluid into a continuous flow of the fracturing fluid may be achieved by a surface fracturing pump. In some embodiments, providing the nanosilica carrier fluid to the fractures includes alternately pulsing quantities of the nanosilica carrier fluid and the fracturing fluid. This can be achieved with surface fracturing pump and switching between the two fluids. The quantities of the nanosilica carrier fluid may be discrete quantities that are spaced apart from each other by the quantities of the fracturing fluid, and vice versa.

Pulsing the quantities of the nanosilica carrier fluid may include injecting the nanosilica carrier fluid at a rate between 1 barrel per minute and 120 barrels per minute, or between 5 barrels per minute and 50 barrels per minute. Pulsing the quantities of the fracturing fluid may include injecting the fracturing fluid at a rate between 1 barrel per minute and 120 barrels per minute, or between 5 barrels per minute and 50 barrels per minute. A total volume or pulse duration of the nanosilica carrier fluid and the fracturing fluid may vary based on the intended treatment. An elapsed time between pulsing the quantities of the nanosilica carrier may be between 2 seconds and 10 minutes, or between 10 seconds and 1 minute.

In 208, an additional fluid is optionally provided to the fractures via the wellbore. The additional fluid may be provided continuously (not pulsed). In some embodiments, the additional fluid is a nanosilica carrier fluid such as that described with respect to 206. In some embodiments, the additional fluid is a fracturing fluid, such as that described with respect to 204. The additional fluid may include a proppant loading of up to about 12 pounds per gallon added.

In 210, the nanosilica particles are activated with an activator to yield a nanosilica gel including the proppant. Activating the nanosilica particles as a function of time, pH, and temperature after contact with the activator. A viscosity of the nanosilica gel is typically at least 1000 cP or higher at a reservoir temperature after activation. Typical reservoir temperatures range of about 150° to about 400° F. The nanosilica gel may be in the form of a hard plug.

In 212, the wellbore is shut in at a wellbore pressure, thereby allowing the nanosilica gel to harden and form proppant pillars in the fractures. Proppant pillars are formed by alternately pulsing fracturing fluid to create channels and the nanosilica carrier fluid to form the proppant pillars.

The strength of a nanosilica gel, and hence the strength of proppant pillars formed in 212, may be increased by one of the following: increasing a concentration of the nanosilica particles, increasing a concentration of an activator, combining the nanosilica carrier fluid with sand or other proppant, increasing a temperature to which the nanosilica carrier fluid is exposed, increasing a pH of the nanosilica carrier fluid, reducing an amount of water in the nanosilica carrier fluid, and allowing a greater length of time for the nanosilica carrier fluid to harden. Increasing the strength of proppant pillars by one of these factors, such as increasing a concentration of an activator in the nanosilica carrier fluid, may also shorten the length of time required for formation of a nanosilica gel from the nanosilica precursor fluid.

Figure 3A:
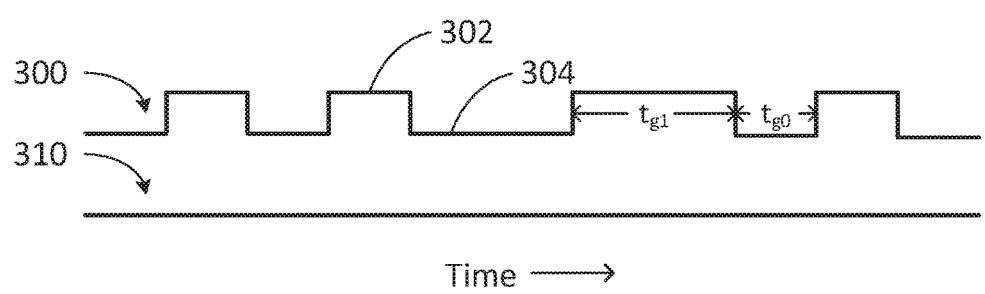
FIG. 3A depicts elapsed time between pulsed quantities of nanosilica carrier fluid in a continuous flow of fracturing fluid.

FIG. 3A depicts elapsed time between pulsed quantities of nanosilica carrier fluid in a continuous flow of fracturing fluid as a function of time. Waveform 300 represents the represents the pulsed flow of nanosilica carrier fluid, and waveform 310 represents the continuous flow of fracturing fluid. Nanosilica carrier fluid injection segments 302 of waveform 300 correspond to operation of the pump that injects the nanosilica carrier fluid ("pump on"). A duration $t_{g1}$ of nanosilica carrier fluid injection segments 302 is typically in a range of 2 seconds to 10 minutes, or 10 seconds to 1 minute, and can be the same or different for one or more nanosilica carrier fluid injection segments. Nanosilica carrier fluid injection segments 302 are separated in time by nanosilica carrier fluid noninjection segments 304. Nanosilica carrier fluid noninjection segments 304 correspond to cessation of the pump that injects the nanosilica carrier fluid ("pump off"). A duration $t_{g0}$ of nanosilica carrier fluid noninjection segments 304, is typically in a range of 2 seconds to 20 minutes.

Figure 3B:
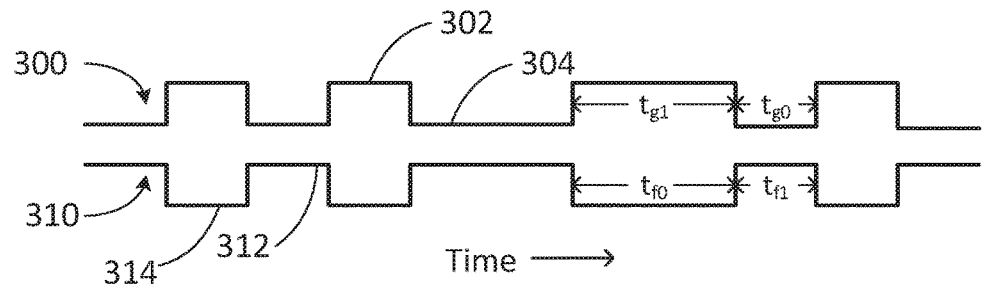
FIGS. 3B-3D depict temporal relationships between pulsed quantities of nanosilica carrier fluid and fracturing fluid.
Figure 3C:
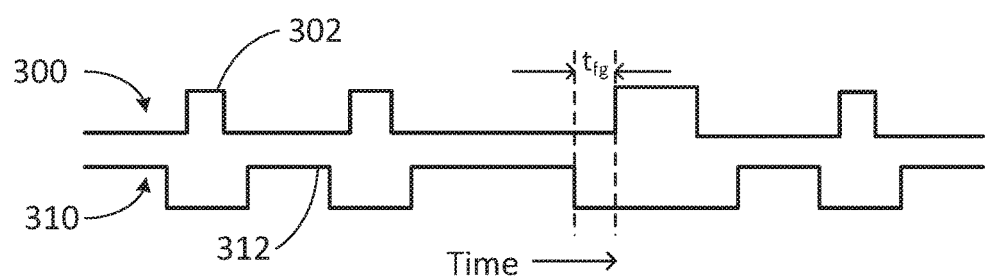
Figure 3D:
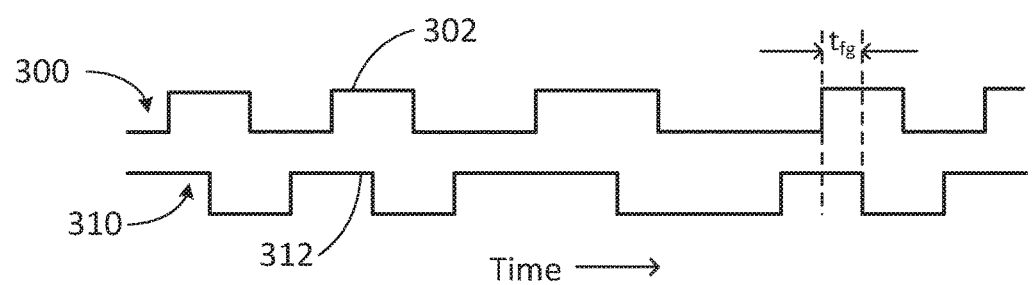

FIG. 3B depicts elapsed time between pulsed quantities of nanosilica carrier fluid and fracturing fluid. Waveform 300 represents the pulsed flow of fracturing fluid, and waveform 310 represents the pulsed flow of nanosilica carrier fluid. Nanosilica carrier fluid injection segments 302 of waveform 300 correspond to operation of the pump that injects the nanosilica carrier fluid ("pump on"). A duration $t_{g1}$ of nanosilica carrier fluid injection segments 302 is typically in a range of 2 seconds to 10 minutes, or 10 seconds to 1 minute, and can be the same or different for one or more nanosilica carrier fluid injection segments. Nanosilica carrier fluid injection segments 302 are separated in time by nanosilica carrier fluid noninjection segments 304. Nanosilica carrier fluid noninjection segments 304 correspond to cessation of the pump that injects the nanosilica carrier fluid ("pump off"). A duration $t_{g0}$ of nanosilica carrier fluid noninjection segments 304, is typically in a range of 2 seconds to 20 minutes. Fracturing fluid injection segments 312 of waveform 310 correspond to operation of the pump that injects the fracturing fluid ("pump on"). A duration $t_{f1}$ of fracturing fluid injection segments 312 is typically in a range of 2 seconds to 10 minutes, or 10 seconds to 1 minute, and can be the same or different for one or more fracturing fluid injection segments. Fracturing fluid injection segments 312 are separated in time by fracturing fluid noninjection segments 314. Fracturing fluid noninjection segments 314 correspond to cessation of the pump that injects the fracturing fluid ("pump off"). A duration $t_{f0}$ of fracturing fluid noninjection segments 314 is typically in a range of 2 seconds to 20 minutes. Nanosilica carrier fluid injection segments 302 and fracturing fluid segments 312 may overlap or may be separated in time by a duration $t_{fg}$. When nanosilica carrier fluid injection segments 302 and fracturing fluid segments 312 overlap, $t_{fg}$ is typically in a range of 2 seconds to 20 minutes. When nanosilica carrier fluid injection segments 302 and fracturing fluid segments 312 are separated in time, $t_{fg}$ is typically in a range of 2 seconds to 20 minutes.

Figure 4:
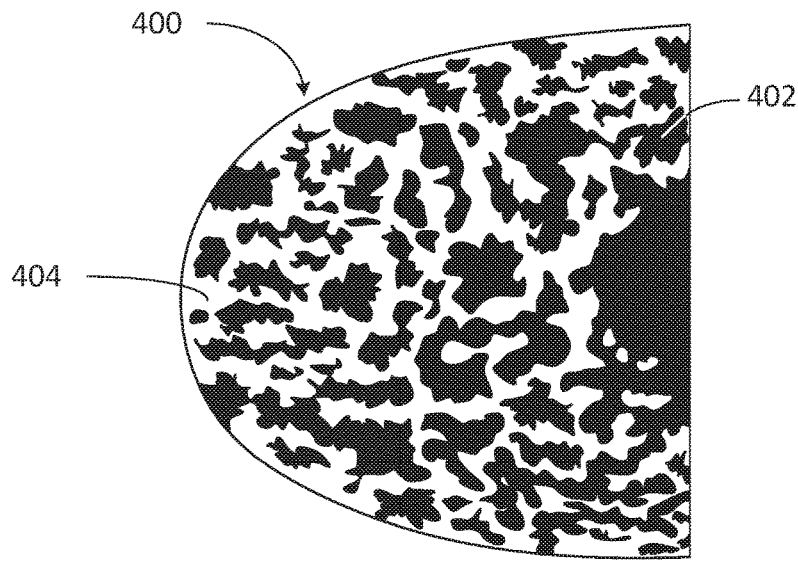
FIG. 4 depicts a cross-sectional view of proppant pillars in a fracture.

FIG. 4 depicts a fracture 400 with proppant pillars 402 and conductive channels 404 between the pillars. In some embodiments, an accelerating agent is included in the nanosilica carrier fluid to reduce the length of time required for gel formation and hardening of the nanosilica. In some embodiments, a retarding agent is included in the nanosilica carrier fluid to increase the length of time required for gel formation and hardening of the nanosilica. A well is typically shut in for a length of time from about 2 hours to about 24 hours.

A compressive strength of the proppant pillars may exceed the overburden pressure of the reservoir. In some embodiments, a compressive strength of the proppant pillars is in a range of about 500 psi to about 20,000 psi. In some embodiments, a permeability of the pillars is about 0.01 mD to about 20,000 D.

EXAMPLES

Results of the variation of parameters in the formation of a nanosilica gel are described below.

To investigate the effect of activators in various concentrations on the gelling of nanosilica, activators were combined with a nanosilica carrier fluid in a ratio of 1:1. The nanosilica, CEMBINDER 17 from AkzoNobel, includes 40 wt % $SiO_2$ dispersed in water. CEMBINDER 17 has a pH of 9 and a viscosity 6 cP at room temperature. An average size of the nanoparticles is 17 nm. A ratio 1:1 of CEMBINDER 17 to different activators concentrations was used as described below.

Acetic acid was used to lower the pH and sodium hydroxide was used to increase the pH as needed. For 100% potassium silicate and 100% sodium silicate (concentrated salts), no gel was formed. For 100% sodium carbonate (concentrated salt), a weak gel was formed in 1 hour to 8 hours. For 10% calcium chloride, a weak gel was formed in 20 minutes to 1 hour. For 10% sodium chloride, a strong gel was formed in 1 second to 5 seconds. For 10% sodium chloride, a nanosilica gel formed by combining a 1:1 weight ratio of activator and nanosilica particles in a nanosilica carrier fluid and heating overnight at 75° C. yielded a hard plug having sufficient strength to keep a fracture open.

To investigate the effect of pH on the gelling of nanosilica, different samples were prepared at different pH values with two different salts (10% KCl and 10% NaCl) as activators. The volume ratio of nanosilica to activator was 1:1.

Results indicated that pH is a factor in gel formation. With no pH modification, the nanosilica gel was slightly alkaline (pH 8.8 and 8.7 for 10% NaCl and 10% KCl, respectively). Also, both salts resulted in rigid gels. At high pH (pH=13), it was found that about half of the gel was converted into water, while the remaining half became a strong gel. Thus, increasing the pH may be used advantageously, for example, to concentrate a proppant in a nanosilica gel and increase the strength of a resulting proppant pillar. When the pH of a nanosilica carrier fluid was made to be acidic by the addition of acetic acid, the resulting gel appeared no different than the gel obtained in the absence of pH modification.

To investigate the effect of various proppants on nanosilica gels, a nanosilica gel was mixed with sand. The results showed that nanosilica gel was able to suspend the sand. The nanosilica gel adhered to the glass wall of the container, and thereby resisted settling. To a composition including 40 wt % nanosilica and 60 wt % fracturing fluid, 4 pounds per gallons of proppant were added. The proppants were suspended in the fracturing gel in the presence of nanosilica gel. Over time, these gels started to crack, and channels were formed in the gel. In contrast, for controls that included fracturing gel but not nanosilica gel, suspension of the proppants was not as complete.

The effect of pulsing a nanosilica carrier fluid comprising a proppant and a clean fracturing fluid (no proppant) was investigated. A clean fracturing fluid was prepared. A nanosilica carrier fluid including 40 wt % nanosilica, 60 wt % fracturing fluid, and 4 pounds proppant per gallon of the nanosilica carrier fluid was prepared. The pulsing procedure (pulse length between 2 seconds and 20 minutes and flow rate between 2 bbl/min and 120 bbl/min at surface conditions) resulted in a suspended gel. The experiment was repeated with 10 pounds of proppant per gallon of fracturing fluid breaker. The fracturing fluid and the nanosilica carrier fluid were separately injected into a graduated cylinder and heated to 75° C. overnight. The experiment demonstrated that the nanosilica gel promoted proppant suspension and the formation of channels over time.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of fracturing a reservoir, the method comprising:
   providing a pad fluid to the reservoir via a wellbore in a well to create fractures in the reservoir;
   providing a fracturing fluid to the fractures via the wellbore;
   providing a nanosilica carrier fluid to the fractures via the wellbore, wherein the nanosilica carrier fluid comprises nanosilica particles, and providing the nanosilica carrier fluid to the fractures comprises pulsing quantities of the nanosilica carrier fluid into a continuous flow of the fracturing fluid or alternately pulsing quantities of the nanosilica carrier fluid and the fracturing fluid, and an elapsed time between pulsing the quantities of the nanosilica carrier fluid is between 2 seconds and 10 minutes;
   activating the nanosilica particles with an activator to yield a nanosilica gel; and
   shutting in the wellbore at a wellbore pressure, thereby allowing the nanosilica gel to form proppant pillars in the fractures.

2. The method of claim 1, wherein the pad fluid comprises at least one of a reactive fluid, slickwater, a linear gel, a crosslinked gel, a viscoelastic surfactant fluid, and a foam gel.

3. The method of claim 1, wherein the fracturing fluid comprises at least one of a reactive fluid, slickwater, a linear gel, a crosslinked gel, a viscoelastic surfactant fluid, and a foam gel.

4. The method of claim 1, wherein the fracturing fluid comprises a proppant loading of up to about 12 pounds per gallon added.

5. The method of claim 1, wherein the fracturing fluid is free of proppant.

6. The method of claim 1 wherein the nanosilica carrier fluid comprises a proppant loading of up to about 12 pounds per gallon added.

7. The method of claim 1, wherein the nanosilica carrier fluid comprises colloidal nanosilica particles.

8. The method of claim 7, wherein a viscosity of the nanosilica gel is at least 1000 cP at a reservoir temperature in a range of 150° F. to 400° F.

9. The method of claim 1, wherein the nanosilica carrier fluid comprises at least one of an activator, a permeability enhancing agent, an accelerating agent, and a retarding agent.

10. The method of claim 9, wherein the permeability enhancing agent comprises polylactic acid.

11. The method of claim 10, wherein the polylactic acid is in the form of beads, fibers, or fabric.

12. The method of claim 10, wherein the permeability enhancing agent comprises at least one of a resin, a salt, benzoic acid, and wax beads.

13. The method of claim 12, wherein the permeability enhancing agent comprises a salt, and the salt comprises an acid salt.

14. The method of claim 1, wherein the elapsed time between pulsing the quantities of the nanosilica carrier fluid is between 10 seconds and 1 minute.

15. The method of claim 1, wherein pulsing the quantities of the nanosilica carrier fluid comprises pulsing discrete quantities of the nanosilica carrier fluid into the continuous flow of the fracturing fluid or alternately pulsing discrete quantities of the nanosilica carrier fluid and discrete quantities of the fracturing fluid.

16. The method of claim 15, wherein the discrete quantities of the nanosilica carrier fluid are spaced apart from each other.

17. The method of claim 1, wherein pulsing the quantities of the nanosilica carrier fluid comprises injecting the nanosilica carrier fluid at a rate between 1 barrel per minute and 120 barrels per minute.

18. The method of claim 17, wherein pulsing the quantities of the nanosilica carrier fluid comprises injecting the nanosilica carrier fluid at a rate between 5 barrels per minute and 50 barrels per minute.

19. The method of claim 1, further comprising, after providing the fracturing fluid and the nanosilica carrier fluid to the fractures, providing a continuous flow of an additional fluid to the fractures.

20. The method of claim 19, wherein the nanosilica carrier fluid is a first nanosilica carrier fluid and the additional fluid is a second nanosilica carrier fluid, wherein the second nanosilica carrier fluid comprises a proppant loading of up to 12 pounds per gallon added.

21. The method of claim 19, wherein the fracturing fluid is a first fracturing fluid, and the additional fluid is a second fracturing fluid, wherein the second fracturing fluid comprises a proppant loading of up to 12 pounds per gallon added.

22. The method of claim 1, wherein a compressive strength of the proppant pillars exceeds an overburden pressure of the reservoir.

23. The method of claim 22, wherein the compressive strength of the proppant pillars is in a range of 500 pounds per square inch to 20,000 pounds per square inch.

24. The method of claim 1, wherein a permeability of the proppant pillars is in a range of 0.00001 Darcy to 20,000 Darcy.

25. The method of claim 1, wherein a permeability of the proppant pillars is zero.

* * * * *